United States Patent [19]

Hoshino

[11] Patent Number: 5,645,253
[45] Date of Patent: Jul. 8, 1997

[54] UNIVERSAL SUPPORT FOR DRUMS

[75] Inventor: Yoshiki Hoshino, Aichi-Ken, Japan

[73] Assignee: Hoshino Gakki Co., Ltd., Japan

[21] Appl. No.: 431,141

[22] Filed: Apr. 28, 1995

[30] Foreign Application Priority Data

Feb. 8, 1995 [JP] Japan .................... 7-001403

[51] Int. Cl.⁶ .................................... F16M 11/14
[52] U.S. Cl. .................... 248/181.1; 248/181.2; 248/276.1; 248/288.31; 84/421
[58] Field of Search ................ 248/181.1, 181.2, 248/276.1, 288.31, 122.1, 635, 516; 84/411 R, 415, 421

[56] References Cited

U.S. PATENT DOCUMENTS

| 3,535,976 | 10/1970 | Osuga | 84/421 |
|---|---|---|---|
| 3,635,119 | 1/1972 | Thompson | 84/411 |
| 4,158,980 | 6/1979 | Gauger | 84/421 |
| 4,307,864 | 12/1981 | Benoit | 248/288.31 |
| 4,430,017 | 2/1984 | Stefancich | 84/421 |
| 4,522,378 | 6/1985 | Nelson | 248/635 X |
| 4,596,176 | 6/1986 | Gauger | 84/421 |
| 4,693,457 | 9/1987 | Kamata | 248/635 X |
| 4,796,508 | 1/1989 | Hoshino | 84/421 |
| 4,967,634 | 11/1990 | Whynott | 84/415 X |
| 5,104,271 | 4/1992 | Lechler | 248/635 X |
| 5,337,645 | 8/1994 | Johnston | 84/421 |

FOREIGN PATENT DOCUMENTS

| 1521903 | 4/1968 | France | 84/421 |
|---|---|---|---|
| 2005317 | 12/1993 | Russian Federation | 4/411 R |
| 2260440 | 4/1993 | United Kingdom | 84/421 |

Primary Examiner—Alvin C. Chin-Shue
Assistant Examiner—Anita M. King
Attorney, Agent, or Firm—Ostrolenk, Faber, Gerb & Soffen, LLP

[57] ABSTRACT

A universal support is provided wherein the angular adjustment provided by the universal support for an object supported thereby remains fixed even though the object, such as a drum, has been removed from the universal support. The universal support is capable of holding a support rod relative to a support stand having an attachment member. The universal support includes a receiving member, with a rod press and a support stand press each attached to the receiving member. The receiving member and the rod press each has a concave surface adapted to accommodate the rod support sandwiched between the contoured surfaces of the receiving member and the rod press. In addition, the receiving member and the support stand press each has a concave surface adapted to accommodate the attachment member of the support stand sandwiched between the concave surface of the receiving member and the support stand press. Thus, the universal support is capable of accommodating the attachment member of the support stand independently of the rod support.

5 Claims, 7 Drawing Sheets

UNIVERSAL SUPPORT FOR DRUMS

BACKGROUND OF THE INVENTION

The present invention relates to a universal support that attaches to a conventional snare drum stand and is capable of being adjusted so that the drum is at a position desired by the performer.

A conventional stand for a snare drum has three support arms for supporting a hoop on the lower side of the snare drum. Each support arm is linked to the stand through a ball joint so that a performer can adjust the snare drum to a desired position and angle.

A significant disadvantage to this type of snare drum stand is that the hoop on the lower side of the snare drum is sandwiched between the support arm which causes a distortion in the sound emanating from the drum. To remedy this disadvantage, the snare drum is often not fixed to the stand but is merely placed on three support arms. However, since the snare drum is merely placed on the support arms, if the drum is to be moved, one must hold both the drum and the stand. Of course, there is always a possibility that a snare drum supported in this manner will fall off during a performance.

SUMMARY OF THE INVENTION

An object of the present invention is to overcome problems encountered with conventional drums stands. To this purpose the universal drum support of the present invention does not affect the sound of the drum supported on it, while it firmly holds the drum at the position and at the angle desired by the performer.

A further object of the present invention is to effect easy and quick positioning of the drum on the support.

Still a further object of the present invention is the ability to maintain the desired position of the universal support to the stand after the drum has been removed from the support and the stand has been folded for either storage or transportation.

The present invention is a universal support adapted for connection to an attachment member of a support stand, and for holding an elongated support at a desired position relative to the support stand. The universal support includes a receiving member, and a first press attached to the receiving member. The receiving member and the first press each have a contoured surface adapted to accommodate the support rod as it is sandwiched between the contoured surfaces of the receiving member and the first press. A second press is attached to the receiving member and spaced from the first press. The receiving member and the second press each have a contoured surface adapted to accommodate the attachment member of the support stand sandwiched between the contoured surfaces of the receiving member and the second press. The universal support is capable of independently accommodating the attachment member of the support stand and the elongated support.

The elongated support may itself be capable of supporting a drum. Thus, the angular displacement between the drum and the support stand is determined by the universal support.

Other features and advantages of the present invention will become apparent from the following description of the invention which refers to the accompanying drawings.

BRIEF DESCRIPTION OF THE DRAWINGS

For a fuller understanding of the nature and objectives of the invention, reference should be made to the following detailed description, taken in connection with the accompanying drawings.

DETAILED DESCRIPTION OF THE INVENTION

Figure 1:
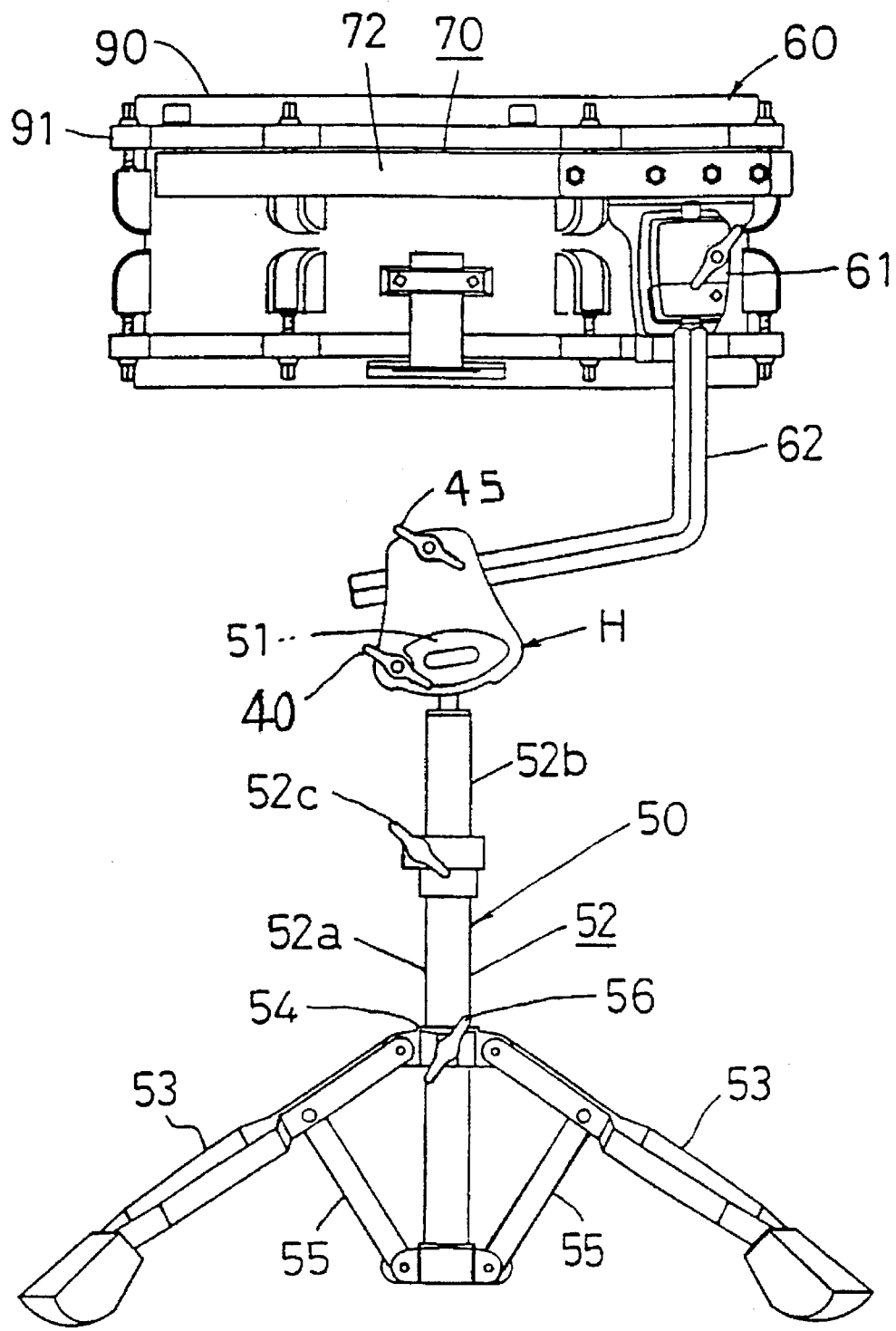
FIG. 1 is a side view of a snare drum being held by a universal support of the present invention.
Figure 2:
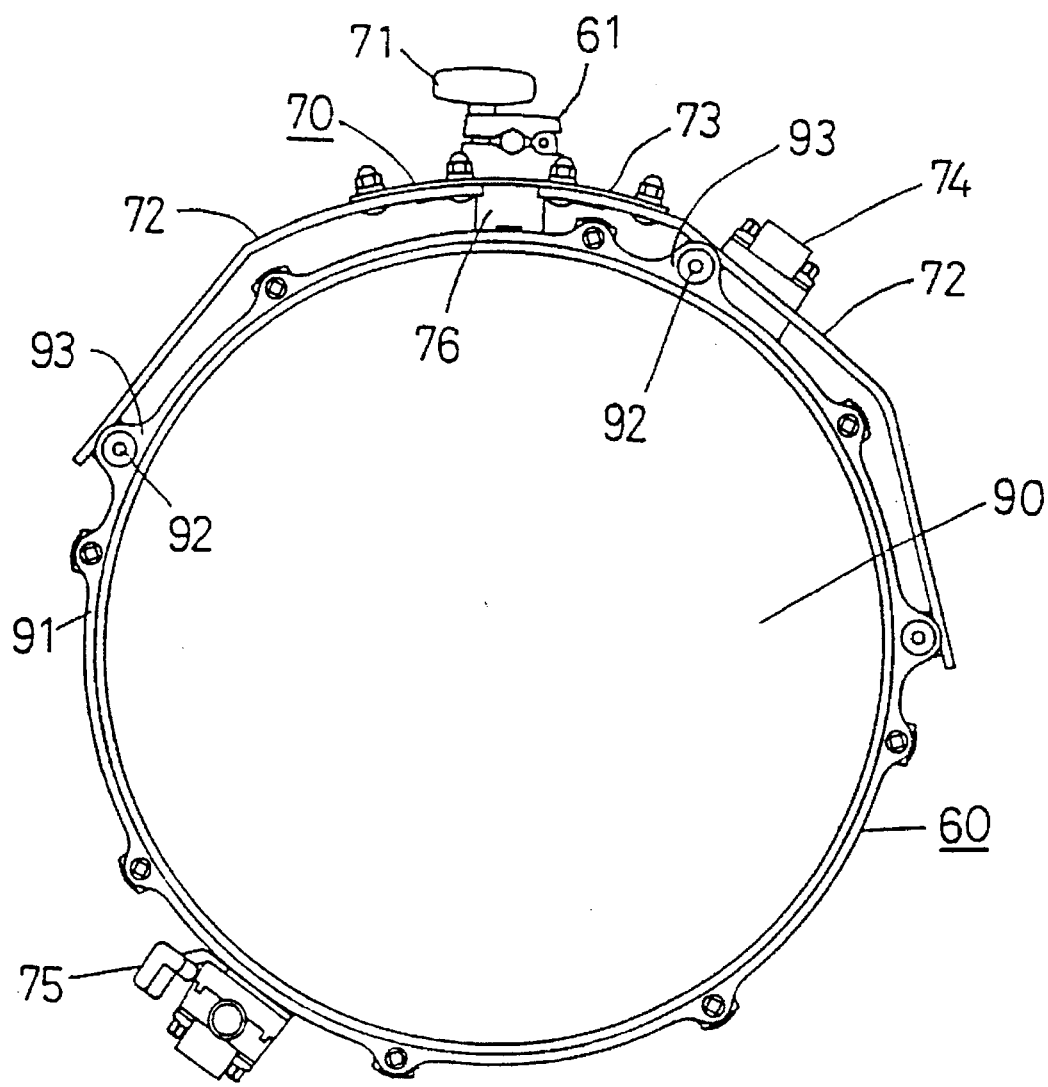
FIG. 2 is a plan view of the snare drum of FIG. 1.

Referring to FIGS. 1 and 2, the universal support H of the present invention is installed at the top of a drum stand 50. A support rod 62 is attached to the universal support H at one end, and is attached at the other end to a bracket 61 of a snare drum 60. The support rod 62 can be adjustably fixed anywhere along its length to universal support H, and thereby adjusts the height of the snare drum 60 from the floor.

Bracket 61 has a curved arm 70 that surrounds the outer periphery of the upper hoop 91 of snare drum 60. Upper hoop 91 can be tightened about a drum 60. Curved arm 70 is connected to upper hoop 91 at three locations and it supports the drum 60 vis-a-vis the drum stand 50. A butterfly knob 71 tightens and loosens the bracket 61 on support rod 62.

Curved arm 70 is located on the lower side of the outer periphery of upper hoop 91. Upper hoop 91 is for the purpose of tightening the drum head 90 on its top side. Hoop installations 93, with installation holes 92, are provided on the outer periphery of upper hoop 91. Since there are a plurality of hoop installations 93 along the upper hoop 91, they distribute the load on snare drum 60 and thereby prevent any undesirable strain on the drum.

It is preferable if hoop installations 93 are separated as widely apart from each other on upper hoop 91 as is feasible. In addition, there can be more than these installations 93 on upper hoop 91 depending upon the size and weight of the drum 60. Snap fixtures 74 are on the side of the drum 60, and each snap fixture is actuated by a switch lever 75.

Curved arm 70 is curved in shaped and surrounds the outer periphery of the shell of drum 60, and comprises two arms 72 which extend from and are fixed on both sides of an installation plate 73. The length of curved arm 70 can be suitably determined by the size of the drum 60 it supports. However, for stability in supporting the drum 60, the arms 72 are typically of a length such that the curved arm 70 surrounds up to about half the outer periphery of drum 60.

Figure 4:
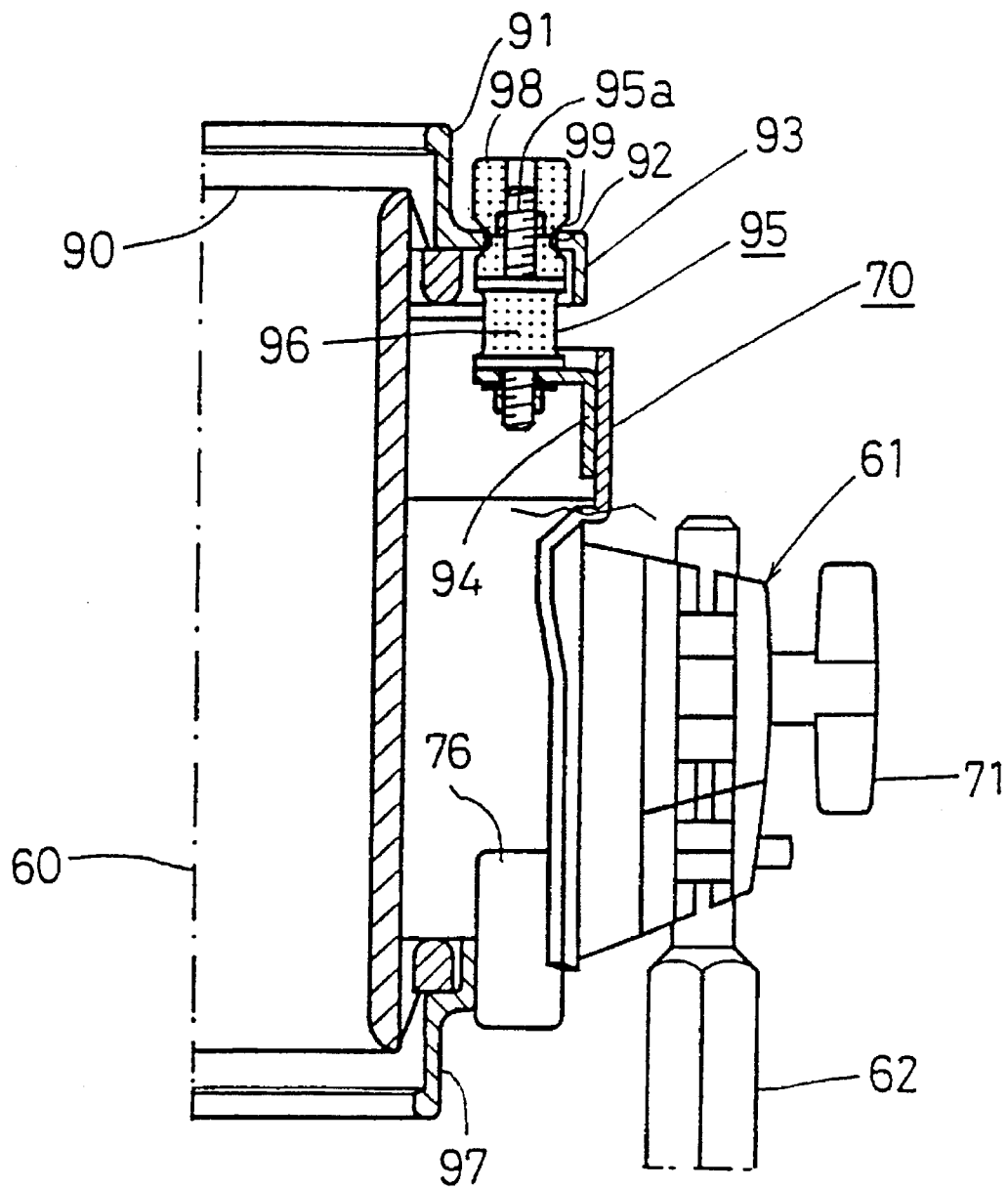
FIG. 4 is a cross-sectional view of the bracket of FIG. 3.

A rubber or plastic stopper 76 is disposed at the bottom of installation plate 73. As shown in FIG. 4, stopper 76 abuts against the lower hoop 97 of drum 60 to prevent excessive shaking of drum 60.

Figure 3:
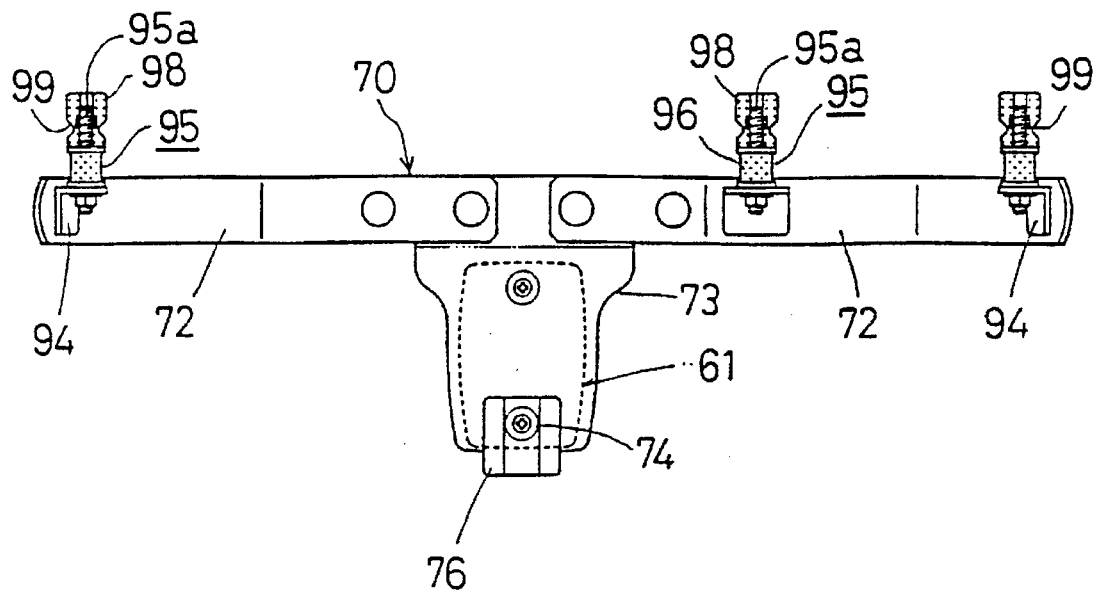
FIG. 3 is a side view of a bracket and a curved arm used to support the snare drum in conjunction with the universal support.

As is shown in FIGS. 3 and 4, flange-shaped brackets 94 are soldered or screwed on the under side of curved arm 70, and are positioned thereon to correspond to the positions of hoop installations 93 on upper hoop 91.

Hoop installations 93 and brackets 94 are connected to each other by bolt installations 95. Thus, curved arm 70 is connected to upper hoop 91 by bolt installations 95 engaging brackets 94 and hoop installations 93.

Bolt installations 95 elastically link hoop installations 93 to brackets 94 by a vibration absorber 96 made of a vibration-absorbing material, such as rubber. The vibration absorber 96 absorbs the vibration of drum 60. As shown in FIG. 4, bolt installations 95 include a fastening element above and below the vibration absorber 96. An upper screw 95a extends upwardly from vibration absorber 96, and a rubber seat 98 engages upper screw 95a. Rubber seat 98 prevents vibration of the drum from being transmitted by the bracket and support.

Figure 10:
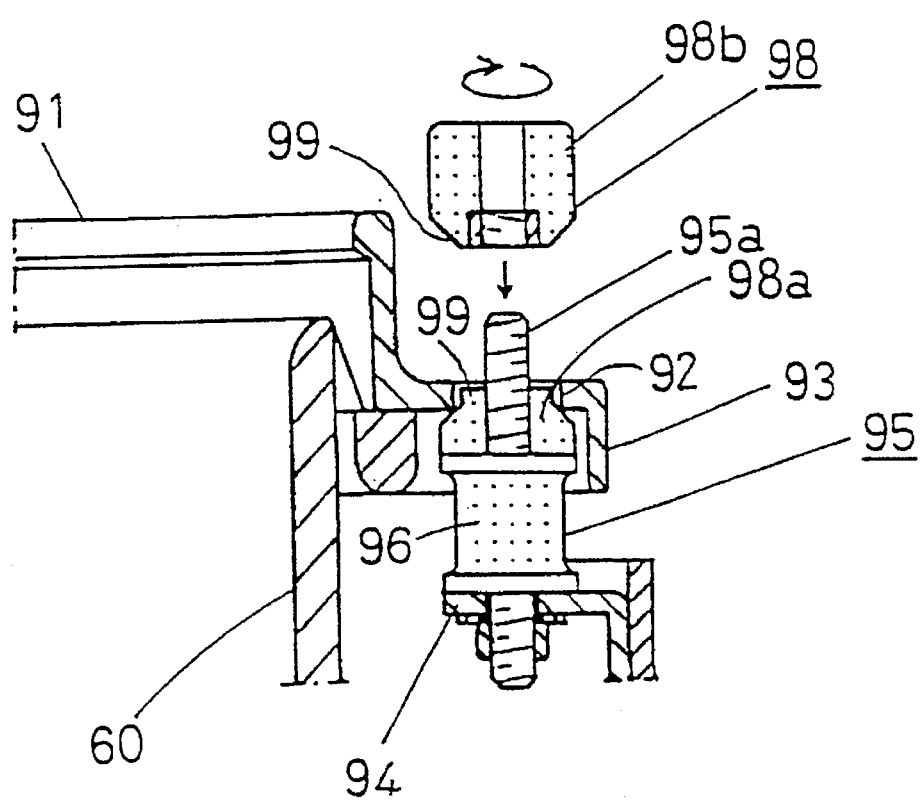
FIG. 10 is a cross-sectional view of the bracket shown in FIG. 3.

Referring to FIG. 10, rubber seat 98 comprises a lower seat 98a that is fixed to upper screw 95a and an upper seat 98b that is removably installed on upper screw 95a. The upper screw 95a of bolt installation 95 passes through hole 92 of hoop installation 93 and thereby lower seat 98a abuts the lower side of hoop installation 93. Upper seat 98b is screwed to upper screw 95a, with the result that upper and lower seats 98a and 98b come in contact with each other at terminals 99 for each of the lower and upper seats 98a and 98b. At terminals 99 both the lower and upper seats 98a and 98b are tapered which minimizes contact of the lower seat 98a with hoop installation 93 at hole 92.

The terminal outer periphery of lower seat 98a and upper seat 98b are tapered and narrow in form as they engage each other at hole 92. By so shaping the upper and lower seats 98a and 98b the contact between rubber seat 98 and hoop installation 93 is kept at a minimum to reduce the transmission of vibrations.

Referring to FIG. 1, support stand 50 is a conventional support stand comprising a main body 52 and legs 53. The main body 52 includes a lower pipe 52a and an upper pipe 52b that is slidably inserted in lower pipe 52a, with the height of the support stand 50 being determined by the length that upper pipe 52b protrudes from lower pipe 52a. Once the support stand 50 is adjusted to its desired height, upper pipe 52b is fixed in place by a tightening bolt 52c. Spherical body 51 is installed on upper pipe 52b.

The end of each leg 53 is attached to the outer periphery of an annular body 54 which slidably engages lower pipe 52a in a freely rotatably manner. Approximately the center of each leg 53 is attached to the lower part of the lower pipe 52a through an arm 55.

Figure 9:
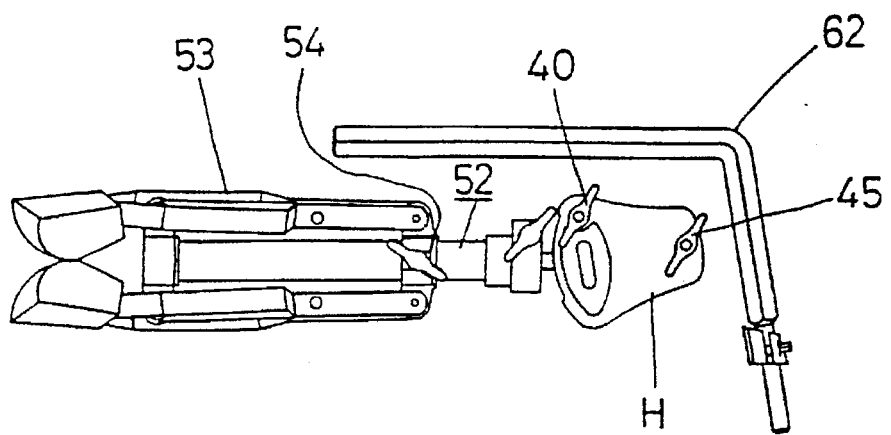
FIG. 9 is a side view of the support stand, shown in FIG. 1, folded.

As shown in FIG. 9, support stand 50 can be folded compactly when not in use or when it is being carried. Support stand 50 is shown with legs 53 attached to the outer periphery of annular body 54. Since annular body 54 is slidable along lower pipe 52a, a screw 56 is used to fix annular body 54 in position on lower pipe 52a.

Referring to FIGS. 5 through 8, the universal support H contains a ball receiving member 10, a ball press 20, a rod press 30, a spherical body tightening nut 40 and a rod tightening nut 45. The universal support H is attached to spherical body 51 of support stand 50.

Figure 5:
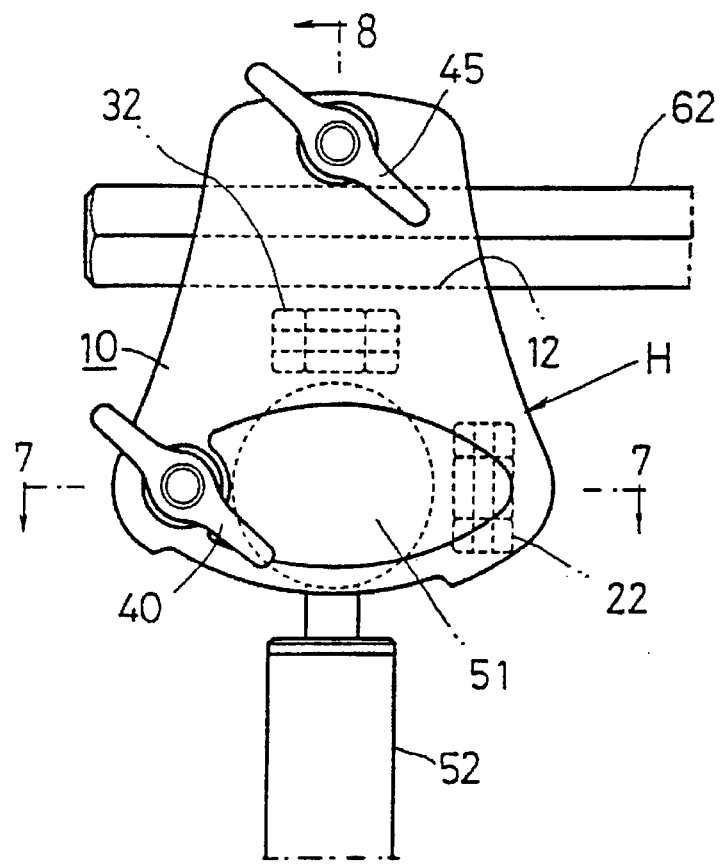
FIG. 5 is an enlarged front view of the universal support.
Figure 6:
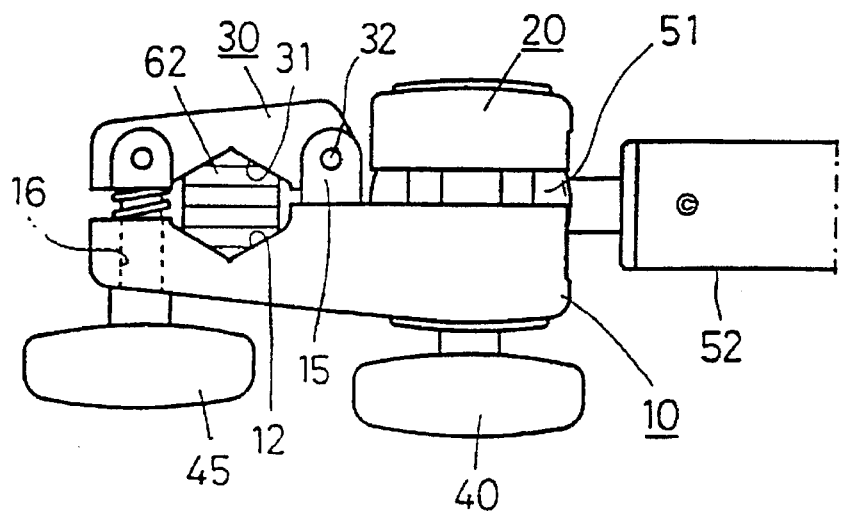
FIG. 6 is a side view of FIG. 5.
Figure 7:
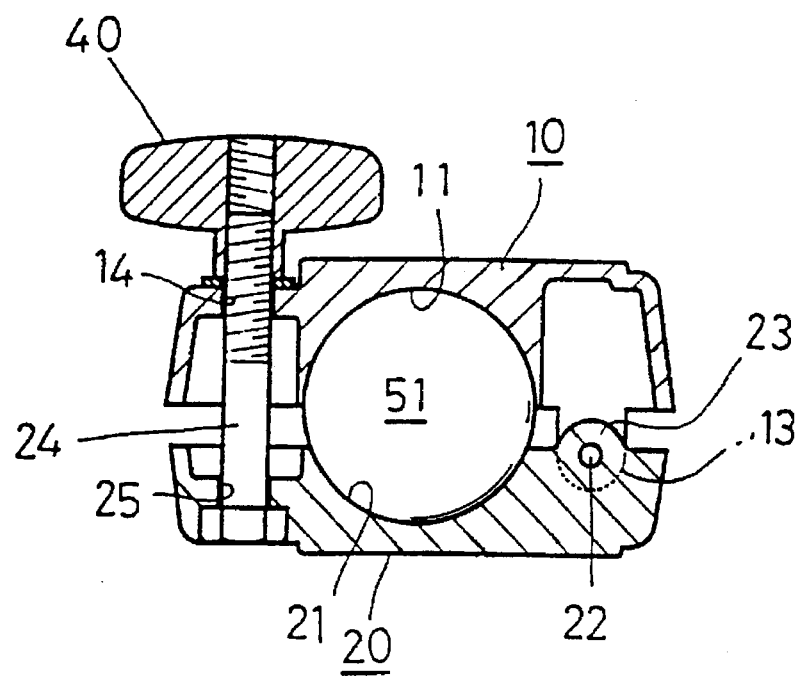
FIG. 7 is a cross-sectional view along the line 7—7 in FIG. 5.

Referring to FIGS. 5 through 7, the universal support H provides universal positioning for drum 60, because receiving member 10 along with ball press 20 retain spherical body 51 at almost any angular position, and because ball receiving member 10 along with rod press 30 adjustably retain support rod 62 at any position along its length. A concave surface 11 for accommodating spherical body 51, and a concave surface 12 for accommodating support rod 62 are formed on the interior of ball receiving member 10.

The interior concave surface 11 of ball receiving member 10 is formed in the same shape as the exterior surface of spherical body 51. Ball receiving member 10 has a first holder 13 disposed on the same side as concave surface 11. First holder part 13 is linked with a holder 23 of ball press 20 by a pin 22, thereby rotatably supporting ball press 20 on ball receiving member 10. More specifically, holder 23 is formed on the side of ball press 20 that corresponds to holder 13 of ball receiving member 10, so that holder 23 is rotatably connected to holder 13 by pin 22. Like concave surface 11, ball press 20 has an interior concave surface 21 which accommodates spherical body 51. Spherical body 51 is sandwiched between ball receiving member 10 and ball press 20. A threaded bolt 24 engaging a threaded tightening knob 40 is disposed through hole 14 of ball receiving member 10 and hole 25 of ball press 20 at a side opposite holder 13 and 23.

Figure 8:
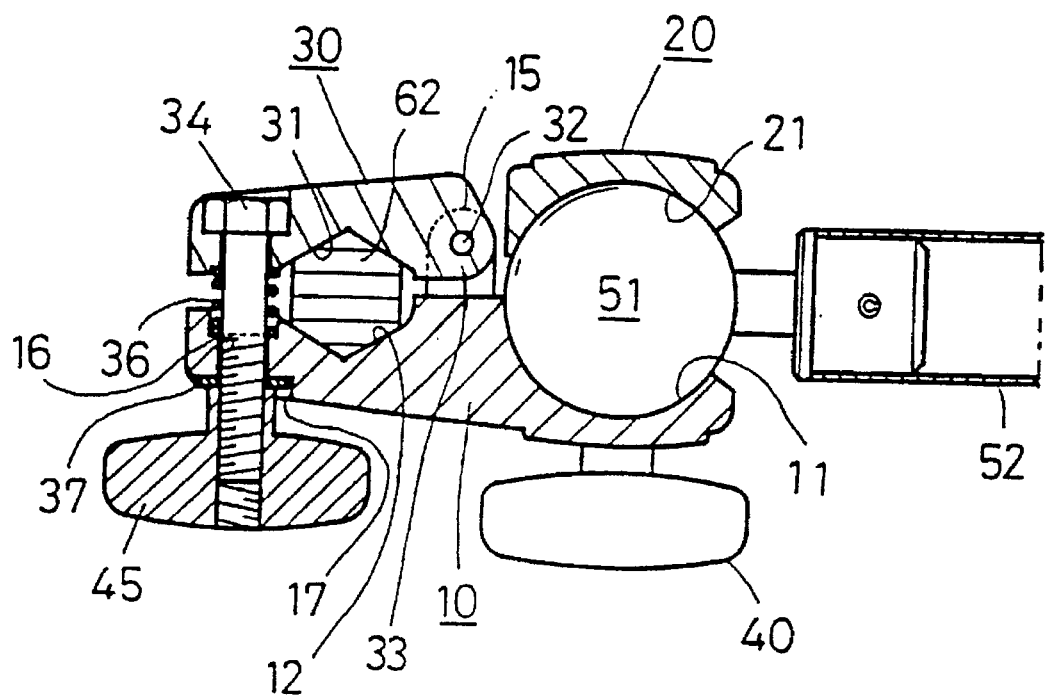
FIG. 8 is a cross-sectional view along line 8—8 in FIG. 5.

Referring to FIG. 8, ball receiving member 10 has the interior concave surface 12 formed at its upper end. The concave surface 12 is shaped to conform to the outer surface of the support rod 62. The support rod 62 is a bar-shaped body whose cross section is hexagonal. An interior concave surface 31 of rod press 30 is likewise shaped to conform to the outer surface of support rod 62.

A second holder 15 is provided on ball receiving member 10. Second holder 15 is linked with a holder 33 of the rod press 30 by a pin 32. Thus, support rod 62 is sandwiched between ball receiving member 10 and rod press 30, and is accommodated in their interior concave surfaces 12 and 31, respectively.

Threaded bolt 34 has a tightening head at one end and the other end engages a knob 45. Bolt 34 extends through a hole 16 in ball receiving member 10. By tightening knob 45 to bolt 34, support rod 62 is retained between ball receiving member 10 and rod press 30. An engaging step 17 is formed in ball receiving member 10 for engaging knob 45 when knob 45 is tightened. Thus, with rod press 30 having a concave surface 31 which accommodates support rod 62 together with concave surface 12 of ball receiving member 10, the two elements are easily tightened or loosened about support rod 62 by knob 45. Engaging step 17 assures proper tightening of knob 45. A spring 36, which extends along bolt 34, and a metal washer 37 are provided to prevent knob 45 from being loosened.

On the side of ball press 20 opposite holder 23, a threaded bolt 24 is provided. Bolt 24 is inserted into a tightening hole 25 of ball press 20 and extends through a hole 14 of ball receiving member 10, and is screwed to knob 40. Thus, bolt 24 is tightened by knob 40 to retain spherical body 51 sandwiched between ball receiving member 10 and ball press 20.

In universal support H, spherical body 51 is inserted between accommodating concave surfaces 11 and 21, and ball receiving member 10 and ball press 20 can be rotated about spherical body 51. As the knob 40 is screwed to bolt 24, the ball receiving member 10 and the ball press 20 are tightened, with their position held fixed about spherical body 51.

Rod press 30 has holder 33 on the same side as it has concave surface 31. Holder 33 corresponds to holder 15 of ball receiving member 10. Holder 33 and holder 15 are linked by pin 32. Thus, rod press 30 is rotatable to ball receiving member 10.

The tightening head of bolt 34 is positioned on rod press 30 opposite holder 33. Knob 45 is screwed to bolt 34, and support rod 62 is either tightened or loosened between ball receiving member 10 and rod press 30.

Support rod 62 can be retained anywhere along its length to ball receiving member 10 and rod press 30 by tightening tightening knob 45 to bolt 34. Tightening knob 45 engages step 17, with the consequence that the tightened position is firmly fixed.

By use of the universal support H, support rod 62 can be easily and accurately adjusted along its length by the performer. Also, the performer can mark the fixing position for support rod 62 on the rod's surface.

In the universal support H of the present invention, the support rod for a drum can be held in a fixed position by the ball receiving member 10 and rod press 30, yet it can be easily removed and reattached. Referring to FIG. 9, even if the support rod of the drum is removed from the universal support H, when the support rod is reattached, it will maintain its same angular position. The angular position of the support rod is determined by the engagement of universal support H to spherical body 51, and that engagement is not affected by the removal of the support rod from the universal support H.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A universal support comprising:

a receiving member;

a first press attached to said receiving member, an elongated support, said receiving member and said first press each having a first contoured surface adapted to accommodate said elongated support relative to a support stand having an attachment member, said elongated support sandwiched between said first contoured surfaces of said receiving member and said first press; and a second press attached to said receiving member and spaced from said first press, said receiving member and said second press each having a second contoured surface adapted to accommodate said attachment member of said support stand sandwiched between said second contoured surfaces of said receiving member and said second press;

a bracket attachable to an end of said elongated support opposite the end attached to said universal support;

a curved arm is attached to said bracket, said curved arm adapted to extend partially around the periphery of a drum having a lower hoop and an upper hoop;

a plurality of hoop installations on said upper hoop;

said bracket having a vibration-absorbing means to abut said lower hoop of a said drum; and said curved arm connected to each of said hoop installations through a vibration-absorbing seat, said vibration-absorbing seat having a vibration-absorbing upper seat and a vibration-absorbing lower seat, with said vibration-absorbing upper seat and said vibration-absorbing lower seat adapted to sandwich at least one of said hoop installations therebetween.

2. The universal support of claim 1, wherein said hoop installations are screwably attachable to said curved arm.

3. The universal support of claim 1, wherein said curved arm is adapted to extend around no more than half the outer periphery of said drum.

4. The universal support of claim 1, wherein said curved arm includes three hoop installations.

5. The universal support of 1, wherein said vibration-absorbing upper seat and said vibration-absorbing lower seat each have terminal ends which are adapted to contact each other for connecting said curved arm to said hoop installations, said terminal ends of said vibration-absorbing lower seat and said vibration-absorbing upper seat being tapered to thereby minimize contact with said hoop installations.

* * * * *